United States Patent [19]

Auger et al.

[11] 4,097,574

[45] Jun. 27, 1978

[54] PROCESS FOR PRODUCING A SYNTHETIC RUTILE FROM ILMENTITE

[75] Inventors: Robert G. Auger, Monroeville; Edward F. Restelli, Jr., Oakmont, both of Pa.

[73] Assignee: United States Steel Corporation, Pittsburgh, Pa.

[21] Appl. No.: 696,596

[22] Filed: Jun. 16, 1976

[51] Int. Cl.² .................... C01G 23/04; C01G 49/06; C01G 49/02
[52] U.S. Cl. ........................... 423/74; 423/86; 75/1 T; 423/632; 423/633
[58] Field of Search ................ 423/86, 74, 632, 633; 75/1 T

[56] References Cited

U.S. PATENT DOCUMENTS

| 1,325,561 | 12/1919 | Farup | 423/86 X |
| 2,804,375 | 8/1957 | Kamlet | 423/86 |
| 3,428,427 | 2/1969 | Raicevic | 423/86 |
| 3,457,037 | 7/1969 | Aramendia et al. | 423/86 |
| 3,529,933 | 9/1970 | Honchar | 423/86 |
| 3,922,164 | 11/1975 | Reid et al. | 423/86 X |

FOREIGN PATENT DOCUMENTS 247,110  9/1963  Australia.

OTHER PUBLICATIONS

The Australasian Institute of Mining and Metallurgy Proceedings, Jun., 1965, pp. 21-43.

*Primary Examiner*—Edward Stern
*Attorney, Agent, or Firm*—William L. Krayer

[57] ABSTRACT

Synthetic rutile is made from ilmenite by pre-oxidizing it, reducing it in a fluid bed, thereafter aeration leaching it, optionally acid leaching, and drying.

12 Claims, 1 Drawing Figure

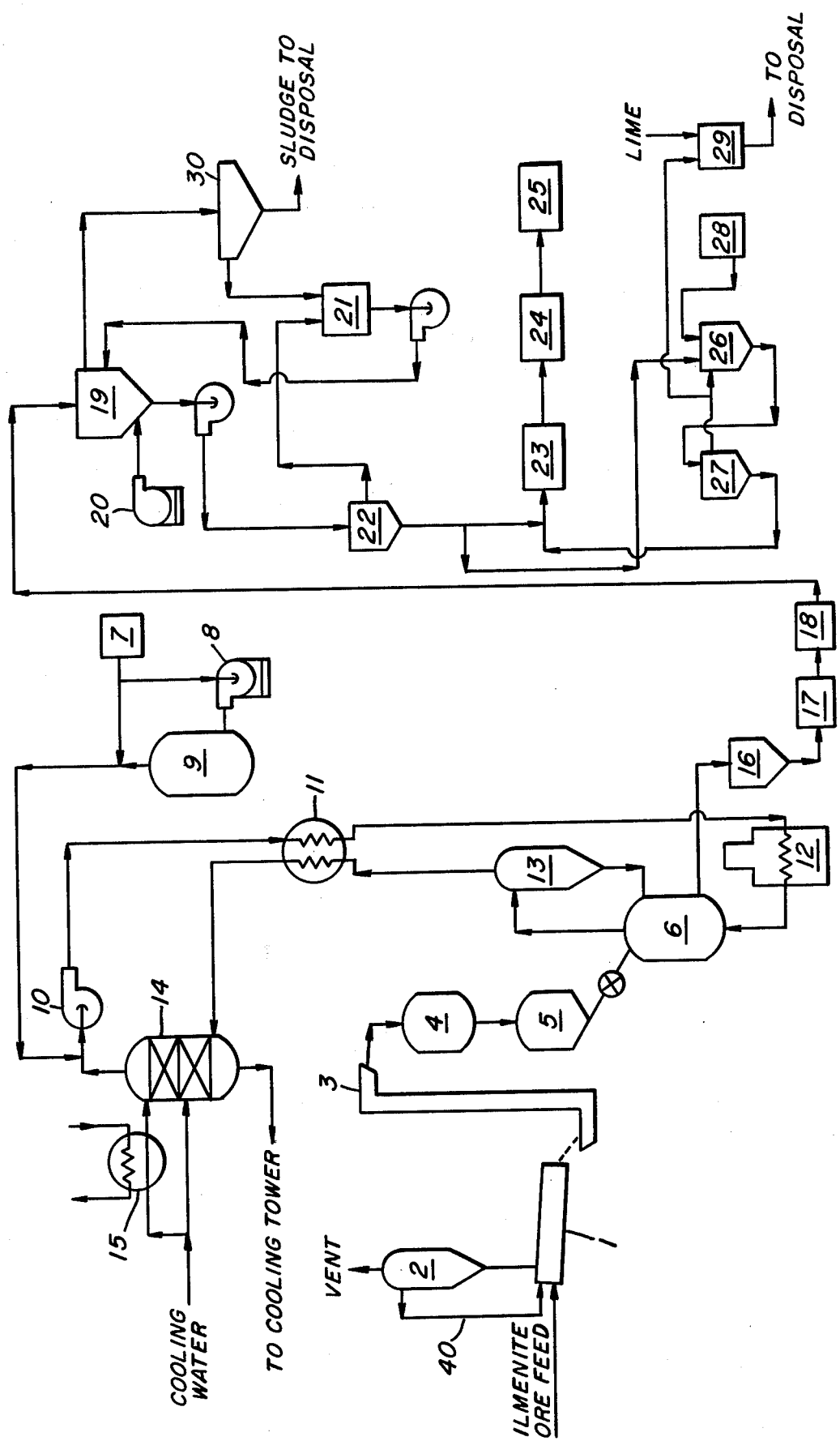

PROCESS FOR PRODUCING A SYNTHETIC RUTILE FROM ILMENTITE

BACKGROUND OF THE INVENTION

This invention relates in general to a process for producing synthetic rutile and more particularly to a process for producing synthetic rutile having a titanium dioxide content of about 85 to 95 percent by weight. White paint pigment is primarily titanium dioxide, and historically has been produced by two processes, the sulfate process which uses ilmenite (a mineral consisting mainly of $FeO.TiO_2$) as a raw material, and the chloride process which uses rutile (containing approximately 95 to 96 percent titanium dioxide by weight) as a raw material. The chloride process, while technically difficult to operate, presently enjoys more favorable economics than the sulfate process and generates less waste material for disposal. For these reasons, consumers of titanium ore have shifted their demand from ilmenite to rutile, causing a shortage of rutile and an excess of ilmenite. This change in markets has encouraged an effort to develop a process for converting ilmenite into a synthetic rutile.

There are many different proposed processes for producing synthetic rutile, most of which fall into one of three classifications: (1) smelting processes, where the iron part of the ilmenite is reduced and melted at temperatures over 2000° F, to separate the iron from the titanium which is usually in the form of a slag; (2) acid leaching processes, where the iron content of the ilmenite is separated from the titanium by dissolving the iron as a soluble salt of the acid and wherein the leaching may be performed with or without previously reducing the iron oxide in the ilmenite; and (3) aeration leaching of ilmenite, in which most of the iron oxides are reduced to metallic iron before leaching. Aeration leaching comprises slurrying the reduced ilmenite in water and adding air to the water over a period of time to provide dissolved oxygen. The water will slowly dissolve the reduced iron, and the dissolved iron reacts with dissolved oxygen to produce insoluble iron oxide which reprecipitates as a separate particle that can be physically separated from the titanium dioxide by flotation or other conventional mineral dressing techniques.

Each of these basic processes has been proved technically feasible, but each has an economic drawback which has hindered the general commercialization of the process.

The smelting process has been used for many years to produce a pig iron and titanium slag. The difficulty of this process is that it requires a large amount of electric power, and requires a market for the by-product pig iron, the sale of which is critical to the economics of the process.

The acid leaching process does not require complete reduction of the iron oxide to metallic iron and thus has a relatively low cost for the reduction step. However, it requires a large quantity of strong acid, such as sulfuric or hydrochloric acid, which results in either a high cost for fresh acids and disposal of waste acid, or an expensive acid generation plant.

An aeration leaching process as proposed by Becher in Australian Pat. No. 247,110 and described by Becher, Canning, Goodheart and Uusna in the Australasian Institute of Mining and Metallurgy Proceedings (June, 1965) page 21, avoids the high cost of strong acid leaching, but substitutes a high-cost reducing step which uses a rotary kiln and solid carbon in the form of coal or char to reduce 95 percent or more of the iron oxide in the ilmenite to metallic iron. Although Becher suggests that a fluid bed could be substituted for the kiln, and that hydrogen or carbon monoxide could be substituted for solid carbon as a reducing agent, he does not recommend either of these changes. He states that, first, the use of a solid carbon reductant in a fluid bed is impractical because the carbon would rapidly turn into dust and could not be recycled and, second, the use of hydrogen or carbon monoxide as a reductant would be uneconomical because of the poor utilization of both of these gases as shown in the literature. But, even more important than the economics of using hydrogen as a reductant is the fact that no data are presented to support the suggestion that ilmenite reduced with hydrogen is amenable to aeration leaching. It is common knowledge in the ferrous metals industry that the physical characteristics of reduced iron are very much dependent upon the conditions of reduction. For example, iron reduced by hydrogen can vary from pyrophoric to inert, depending upon the conditions maintained in the reducer. Thus it is not at all evident from the literature that the Becher leaching process would work on an ilmenite that was not reduced by a solid reductant such as coal or coke.

The applicants herein postulated that fluid-bed hydrogen reduction of ilmenite could be used in conjunction with aeration leaching, optionally followed by acid treatment, to produce a synthetic rutile that was acceptable for use in manufacturing paint pigments and metallic titanium, that is, having a titanium dioxide content of approximately 85-95 percent by weight and, further, that a combination of fluid-bed hydrogen reduction and aeration leaching, together with possible acid treatment, would be lower in cost than other proposed synthetic rutile processes.

It is therefore the primary object of our invention to provide an efficient and economic process to produce synthetic rutile. This and various other objects and advantages of our invention will become more apparent when taken in conjunction with the following detailed description, examples and drawing in which the single FIGURE is a schematic flow diagram of the invented process.

SUMMARY OF THE INVENTION

Our invention is a method of processing ilmenite ore or concentrate to produce a synthetic rutile, wherein an ilmenite or concentrate is (1) treated to preoxidize FeO to $Fe_2O_3$, (2) placed in a hydrogen atmosphere preferably at about 1400° to 1700° F and about 0 – 300 psig in a fluidized bed to reduce iron therein to the metallic state, (3) partially cooled, (preferably from ambient temperature to 400° F), (4) subjected to an aeration leach, and (5) dried. The material may be subjected to an acid leach after the aeration leach to remove traces of Mg, Fe, Mn, and Ca.

Our invention will be explained with reference to the attached drawing, which is a flow diagram of our process.

As shown in the drawing, ilmenite ore concentrate is charged to the preoxidizer 1, in which the $Fe^{++}$ iron is oxidized to $Fe^{+++}$, rendering the iron more amenable to subsequent reduction. The preoxidizer 1 may be a rotary kiln or fluid bed. The oxidation of $Fe^{++}$ to $Fe^{+++}$ is accomplished by contacting the ilmenite ore with an oxidizing gas. The oxidizing gas may be air, or air mixed with inert or combustion gases, or excess air present when a fuel has burned with more than the theoretical amount of air required for complete combustion. The mechanism by which the oxidizing gas is brought into contact with the ilmenite is not critical to the process. The temperature to which the preoxidation is carried out is not critical to the operation, except that the preferred temperature range is 1,100° to 1,600° F. Oxidation at higher temperatures may result in sintering of the material which may reduce subsequent leachability. The level of preoxidation achieved will affect the degree of success of the process, since reducibility and leachability of the ilmenite concentrate in subsequent steps improves with increasing level of preoxidation, and decreasing Fe++ in the preoxidized product.

Exit gas from the preoxidizer may pass through a dust collector 2 and collected fines may be recycled through line 40 back to the preoxidizer 1 or discharged.

Hot preoxidized material is transferred through hot feed elevator 3 from the preoxidizer 1 to hold tank 4. The preoxidized concentrate is preferably kept covered to minimize heat losses. The concentrate may also be transferred by a screw feeder, by transport using hot gases or by gravity. The holding tank 4 may be used to maintain continuity of operation. If more than one fluidized bed reducer 6 is used (depending upon desired process capacity), a charge drum 5 or other suitable device may be used to feed the appropriate reducer 6. A batch fluid-bed reactor is preferred for the reducer, although a continuous fluid-bed reactor (with continuous feed and product withdraw) may also be used. The advantage of the batch reactor is that all particles discharged from the unit have approximately the same degree of reduction and therefore produce a product of more uniform consistency after leaching. The pressure at which the reduction of the ilmenite ore takes place is not critical to this invention except as it affects the economics of the operation. Successful reduction may be carried out at atmospheric pressure, or at elevated pressures. The preferred pressure range is 30 to 75 psig within which the best economy in reducing gas production, purification, and recycle system is achieved. The reducing gas may be hydrogen, carbon monoxide, or a mixture of both and may also contain small amounts of water vapor, preferably below 2%, for 90% reduction. Percent reduction means the amount of oxygen, expressed as a percentage of oxygen in the theoretical maximum oxidation state of the iron present, which would be required to achieve that state, i.e. where T = theoretical maximum oxygen, A = actual oxygen present, and R = reduction, $\% R = (T-A)/T \times 100$. The preferred reductant is high-purity hydrogen, since the rate of reduction of iron oxides in the ilmenite is highest with this gas at a given temperature. The hydrogen may be produced in a conventional hydrogen plant 7, reforming naphtha or natural gas, shift-converting CO therefrom and water to hydrogen and carbon dioxide, and purifying the gas by absorbing the carbon dioxide. The hydrogen passes through compressor 8 and is mixed with purified recycle gas. A surge tank 9 may be used to provide surge volume if batch reduction is used. The gas is then partially heated with hot reactor off-gas in a heat exchanger 11 and is heated to a temperature above the operating temperature of the fluid-bed reducer in a fired hydrogen heater 12. The hydrogen can therefore provide both the heat of reduction and the heat energy which will be lost in the fluid-bed reducer 6. The reducer 6 off-gas, rich in hydrogen and containing some water vapor, is passed through a dust collector 13, heat exchanged with incoming reducer gas at 11 and is then purified for recycle by first scrubbing in wash tower 14 to remove any remaining entrained solids and then chilling to remove water. At elevated pressures, the cooler 15 may be eliminated. The gas is then recycled through pump 10, heat exchanger 11 and heater 12 back to the reducer 6. By employing purification and recycle of reducer off-gas, economy of process fuel and reductant requirements is achieved. The rate of reduction of the iron oxides in the ilmenite by hydrogen or carbon monoxide increases with increasing temperature and increasing gas to solids ratio. The percent reduction achieved in the fluid-bed 6 is critical to the process in that the iron in the ilmenite must be highly reduced in order to be separated from the titanium dioxide in the subsequent aeration leaching. The greater the percent reduction achieved in the fluid-bed reducer 6, the higher the percentage of iron removed by aeration leaching, the higher the percent titanium dioxide in the final product and the higher the selling price of the product. The percent reduction of iron oxides in the ilmenite in the fluid-bed reducer 6 should be greater than 85 percent and preferably 95 to 99 percent. As an illustration, an ilmenite containing 50 percent titanium dioxide and 35 percent total iron present as iron oxide, 99 percent reduction of this iron to metallic iron provides a reduced material that yields a product with about 90 percent titanium dioxide after aeration leaching. Fluid-bed reduction of the ilmenite should be conducted in reducer 6 at temperatures above 1350° F. Increasing temperature increases the rate of reduction. At lower temperatures, the process is operative but the reduction rate is too slow to be economical, necessitating large size reactors to accommodate long reduction times. For example, at a gas-solids ratio of 0.65 scfm per pound of solid using hydrogen as the reductant, at atmospheric pressure, the iron oxide of the above ilmenite may be 47 percent reduced in 100 minutes at 1450° F, and over 90 percent reduced at 1600° F. For commercial operation, the preferred reduction temperature range is 1450° to 1550° F, at which temperature the reduction rate is fast enough for economical operation with reasonable sized reducing vessels, yet low enough to be attainable in commercial vessels. The superficial gas velocity and time required to achieve the desired reduction determine the gas volume/lb material passed through the reducer. The superficial velocity must be high enough to maintain fluidization of the bed but low enough to prevent slugging of the bed or elutriation of material. These superficial velocities are about 1.0 to 3.5 feet per second for −100 m plus 238 m ilmenite. The scfm of reducing gas per pound of solids at these superficial gas velocities will also depend on reactor-temperature pressure and bed height. Gas-to-solids ratio for commercial design may be 0.1 scfm per pound or higher. At 0.3 gas-to-solids ratio, using hydrogen as the reductant at 55 psig, the above ilmenite is 99 percent reduced in 420 minutes at 1435° F. At gas-to-solids ratios below 0.1, the reduction time to achieve 95 percent plus reduction will be too long, making the process uneconomical.

The reduced ilmenite leaves the fluid-bed reducers 6 and is transferred to a hot storage bin 16, then preferably the product goes to a cooler 17 where it is cooled to less than 1000° F and preferably to 400° F in a non-oxidizing atmosphere. The product is then transferred to storage 18, or directly to aeration leach tank 19.

The cooled reduced ilmenite passes through aeration leach tank 19 containing a water solution of a suitable electrolyte such as ammonium chloride. Air is introduced into the solution by a blower or compressor 20. It is assumed that the electrolyte assists the dissolution of oxygen and serves to transfer electrons from the metallic iron in the reduced ilmenite which is then rusted from the ilmenite grains leaving a product high in titanium dioxide content. The process which takes place in the aeration leach tank may be referred to as electrochemical oxidation as described by Becher, supra. The leached iron enters the leach solution as microscopic particles mostly 20 microns or less in size which may be separated from the residual titanium dioxide either by gravity or sizing methods. The percentage of iron leached from the reduced ilmenite in a given time (defined as metallic iron removed) is dependent on the rate of air pumped to the leach tank, the temperature of the leach solution, and the liquid/solids ratio. For optimum metalliciron removal, the air rate should be 1 to 5 cubic feet of air per minute per cubic foot of liquid. Higher or lower air rates result in reduced metallic iron removal. A preferred air rate is 1 to 2 cubic feet per minute per cubic foot of liquid for which power requirement is a minimum. Temperature of the leach solution should be about 120° to 190° F. At higher temperatures the process is operable but air solubility and metallic iron removal are lower than practical. Higher pressures increase $O_2$ solubility and therefore reduce leaching times. Use of oxygen in place of air also reduces leaching times. When ammonium chloride is used as the electrolyte, a concentration of 0.2 to 1.00 percent ammonium chloride should be added to the leach solution to promote the aeration leaching. Higher concentrations may be used but do not further increase the percent of metallic iron removed. Preferred ammonium-chloride concentration is 0.4 to 0.6 percent. The ammonium chloride may be introduced by way of separate ammonium and chloride electrolytes; any source of these ions may be used. The discussion by Becher et al, supra, of electrochemical oxidation is applicable to our invention and is incorporated herein by reference.

Liquid-to-solids ratio for aeration leaching should be at least 1.0 pound of water per pound of reduced ilmenite and the preferred ratio is from 1.5 to 2.5 for which the size of the leaching vessel is a minimum and adequate liquid is provided to slurry the solid material. For aeration leaching performed at the conditions described above, the percent of metallic iron removed increases with increasing time of leaching. Preferred leaching time for greater than 90 percent metallic iron removal is about 8 to 18 hours depending on leaching temperature and pressure. Shorter leaching times result in higher metallic iron levels in the final product. Longer leaching times are unnecessary as leaching is complete after the above time.

Other equipment for separating the iron oxide from the titanium product may be used, such as classifiers, tables, washing towers, etc. The leach solution containing the iron oxide sludge is sent to disposal. The leach solution is recycled from a hold tank 21 back to the aeration leaching vessel 19. The leached product, high in titanium dioxide, is pumped from the leach vessel 19 to thickener 22 from which any residual leach solution is pumped to the leach-solution holding tank 21. The leached product is then passed to classifier 23, drier 24, and sent to product storage unit 25.

An ilmenite concentrate containing about 50 percent titanium dioxide and 35 percent iron will produce a product containing 89 to 90 percent titanium dioxide with about 4 to 5 percent total iron. If higher titanium-dioxide levels are desirable, the aeration leached product may be subjected to an acid cleanup leach employing dilute or concentrated acid. The aeration leached product may be passed to a steam-heated acid leach unit 26 and contacted with hot acid. Hydrochloric, sulfuric, phosphoric, nitric or other strong acids may be used. The aeration leached material made in this process is amenable to acid treatment because the prior treatment steps keep the structure of the material porous and leachable. The acid-leach concentrate is passed to a slurry hold tank 27 from which the acid is recycled back to the leach tank. Fresh acid is added to the acid leach tank from a makeup tank 28 while spent acid is pumped to a neutralization tank 29 for neutralization, preferably with lime, before disposal. The acid-leached product is then classified, dried, and stored. Thus the acid-leaching step can upgrade the aeration-leaching concentrate described above from 89 to 90 percent titanium-dioxide content to about 96 or more percent titanium-dioxide content by removing some of the remaining metallic iron and iron oxides present and some of the MnO, CaO, MgO present, depending on severity of the treatment. Acid leaching of an aeration-leached product is more economical than processes employing acid leaching of partially reduced or completely reduced concentrate.

EXAMPLE 1

Two hundred fifty grams of an ilmenite concentrate containing 49.2 percent $TiO_2$, 36.3 percent $Fe_T$ and 4.29 percent gangue element were charged to a 1½ inside diameter fluid-bed reactor and preoxidized with 0.82 scfm air/lb solids at 1680° F for 2 hours. The concentrate was then reduced with hydrogen at a rate of 1.1 scfm/lb for 110 minutes at atmospheric pressure, the iron in the sample being 94 percent reduced. The reduced concentrate was then cooled and aeration leached at 120° F, with an air rate of 3 cc/min/cc liquid, 0.67 percent $NH_4Cl$ added to the leach water and a liquid-to-solids ratio of 6. After 14 hours of aeration leaching, the ilmenite concentrate residue contained 88.3 percent $TiO_2$ and 6.04 percent $Fe_T$. The residue was then leached in boiling dilute (7%) HCl. $TiO_2$ concentration was increased to 90.9 percent after 15 minutes and to 92.9 percent after 30 minutes. Final $Fe_T$ was 2.39 percent.

EXAMPLE 2

Four hundred grams of the above ilmenite was charged to the fluid-bed reducer and preoxidized with 0.57 scfm air/lb sample for 2 hours at 1650° F converting 98.4 percent of the iron present to $Fe+++$. The sample was then reduced with 0.68 scfm hydrogen/lb sample at 1650° F and atmospheric pressure, with 92 percent of the iron present being reduced to metallic iron in 90 minutes. The sample was then cooled and aeration leached, at 120° F with 2 cc air/min/cc liquid, 0.67 percent $NH_4Cl$ added to the leach water, and a liquid-to-solids ratio of 6. After 14 hours of leach, the sample contained 6.9 percent total iron, 0.4 percent metallic iron and 85 percent $TiO_2$.

EXAMPLE 3

Two hundred fifty grams of the above ilmenite was charged to a fluid-bed reactor and heated to 1550° F with 0.91 scfm air/lb sample, during which processing 84 percent of the iron in the sample was oxidized to Fe+++. The sample was then reduced with 1.09 scfm 85 percent H$_2$ - 15 percent CO/lb sample at 1550° F and atmospheric pressure, the iron in the sample being 90 percent reduced in 150 minutes. The sample was then cooled and aeration leached at 120° F with 2 cc air/min/cc liquid, 0.5 percent NH$_4$Cl added to the leaching water and a liquid-to-solids weight ratio of 2. After 14 hours of leaching, total iron in the sample was reduced to 6.6 percent and TiO$_2$ content was 83.8 percent. The aeration leached sample was then leached with boiling dilute (7% HCl) for 30 minutes, after which the TiO$_2$ was increased to 88.6 percent.

EXAMPLE 4

The reduced ilmenite concentrate of Example 3 was aeration leached at 120° F with 3.2 cc air/min/volume of liquid with 0.67 percent NH$_4$Cl added to the leach solution and a liquid-to-solids ratio of 6. After 15 hours of leaching, total iron content of the ilmenite decreased to 2.85 percent and TiO$_2$ content increased to 88.0 percent.

EXAMPLE 5

A 250-gram sample of the ilmenite concentrate containing 49.2 percent TiO$_2$ and 35.3 percent total iron was charged to the fluid-bed reactor and preoxidized with 0.91 scfm air/lb sample for 1½ hours at 1550° F. The sample was then reduced with 0.8 scfm of H$_2$/lb. sample at 1550° F and 50 psig pressure for 110 minutes, the sample being 92.5 percent reduced after that time. The sample was cooled and aeration leached at 120° F with 1.5 cc/air/min/cc liquid with 0.5 percent NH$_4$Cl added to the leach water and a liquid-to-solids ratio of 2. After 14 hours of leaching, total iron content of the ilmenite decreased to 5.65 percent and TiO$_2$ content increased to 88.6 percent. The ilmenite concentrate residue from aeration leaching was then leached with boiling dilute (7% HCl) for ½ hour after which total iron content of the ilmenite decreased to 2.12 percent and TiO$_2$ content increased to 92.3 percent.

EXAMPLE 6

A sample of ilmenite concentrate already processed through the aeration leaching step of the process and containing 7.90 percent total iron and 82.5 percent TiO$_2$ was leached in boiling 20 percent sulfuric acid for one hour, after which total iron of the sample decreased to 2.10 percent and TiO$_2$ content increased to 92.7 percent. This result demonstrates that acid cleanup leaching may be done with sulfuric acid.

EXAMPLE 7

A 250-gram sample of ilmenite concentrate containing 49.2 percent TiO$_2$ and 35.3 percent total iron was charged to a fluid-bed reactor and preoxidized with 0.64 scfm air/lb sample for 2 hours at 1300° F, with 48 percent of the total iron of the sample being oxidized to Fe+++. The sample was then reduced at 1300° F with 0.64 scfm hydrogen/lb sample at atmospheric pressure reaching 60 percent reduction after 200 minutes, with iron oxides content of the sample being 25.41 percent. The sample was not sufficiently reduced for subsequent aeration leaching.

EXAMPLE 8

Four hundred pounds of ilmenite containing 49.7% TiO$_2$ and 36.1% iron were charged to a fluidized bed reactor being 10 inches in diameter and preoxidized with a mixture of air and nitrogen at temperatures from 1100 to 1400° F for 300 minutes. Percent reduction of the iron in the ilmenite was reduced from 25 to 1 percent during this preoxidation. Four hundred twenty pounds of the preoxidized ilmenite having iron which was only 1.6 percent reduced was charged to a fluidized bed reducer and reduced with 65 scfm hydrogen at 1465° F and 55 psig reactor pressure. After 582 minutes, the iron in the ilmenite was 97 percent reduced. The reduced ilmenite was cooled in nitrogen to 260° F and then charged to a 170 gallon-size-aeration leaching vessel containing 1% NH$_4$Cl solution liquid: solid ratio in the vessel was 2:1. Air was then admitted to the vessel at a rate of 3 scfm air/ft liquid at a temperature of about 145° for 870 minutes. A final ilmenite containing 90 percent TiO$_2$ was obtained.

EXAMPLE 9

Ilmenite processed as described in Example 8 and containing 88% TiO$_2$, 5.7% Fe$_T$, 1.22% MgO and 1.72% MnO was contacted with a concentrated sulfuric acid (experiment A) with concentrated hydrochloric acid (experiment B) and with concentrated phosphoric acid (experiment C) at 200° F for 4 hours. Each of these treatments produced a product containing 93.8 to 95.2 percent TiO$_2$, 0.99 to 2 percent Fe, 0.22 to 0.39 percent MgO and 0.12 to 0.22 percent MnO.

We claim:
1. Method of processing ilmenite to produce a synthetic rutile comprising subjecting the ilmenite or a concentrate thereof to gaseous oxidizing conditions to oxidize FeO therein to Fe$_2$O$_3$, exposing the ilmenite to a hydrogen atmosphere in a fluidized bed at a temperature of at least 1400° F to reduce iron therein to a solubilized metallic state, cooling the ilmenite thus reduced to below 1000° F in a nonoxidizing atmosphere, and contacting the reduced product with an aerated aqueous leach solution to dissolve and oxidize iron therein to an insoluble iron oxide physically separable from said leach solution and from residual insoluble reduced ilmenite product consisting at least substantially of TiO$_2$.

2. Method of claim 1 in which the fluidized bed is pressurized at about 30 – 300 psig.

3. Method of claim 1 in which the aeration-leached ilmenite is subjected to an acid leach to remove traces of metallic iron and other metal oxides.

4. Method of claim 1 in which the fluidized bed reduction step is conducted at a temperature of about 1400° to about 1700° F.

5. Method of claim 4 in which the pressure in the fluidized bed is about 0 to about 300 psig.

6. Method of claim 1 in which the initial oxidizing step is conducted at a temperature of about 1100° to 1600° F.

7. Method of processing ilmenite to produce a synthetic rutile comprising preoxidizing the ilmenite or a concentrate thereof to convert substantially all the iron therein to the Fe$_2$O$_3$ form, exposing the ilmenite thus preoxidized to a reducing atmosphere in a fluidized bed at a temperature of about 1400° to about 1700° F and under a pressure of about 0 – 300 psig to reduce iron oxides therein greater than 85 percent to a solubilized metal state, cooling the ilmenite containing the reduced $Fe_2O_3$ to less than 400° F in a nonoxidizing atmosphere, and contacting the cooled product with an aerated leach solution to dissolve and oxidize iron therein to an insoluble iron oxide physically separable from said leach solution and from residual insoluble reduced ilmenite product consisting at least substantially of $TiO_2$.

8. Method of claim 7 followed by an acid-leach step.

9. Method of claim 7 in which the preoxidation step is performed at a temperature of from 1100° to 1600° F.

10. Method of claim 7 wherein the pressure in the reducing step is about 30 to about 75 psig.

11. Method of claim 7 wherein the reducing step is accomplished with hydrogen gas.

12. Method of claim 7 wherein the iron oxides in the ilmenite in the fluid-bed reducer are reduced more than 85%.

* * * * *